United States Patent [19]

Marker

[11] Patent Number: 5,508,235
[45] Date of Patent: Apr. 16, 1996

[54] CLADDING GLASS CERAMIC FOR USE IN HIGH POWERED LASERS

[75] Inventor: Alexander J. Marker, Moscow, Pa.

[73] Assignee: Schott Glass Technologies, Inc., Duryea, Pa.

[21] Appl. No.: 269,904

[22] Filed: Jul. 6, 1994

[51] Int. Cl.$^6$ .......................... C03C 13/04; C03G 10/12
[52] U.S. Cl. .................. 501/7; 501/37; 501/38; 501/63; 501/69; 501/70; 428/378; 428/384; 428/415
[58] Field of Search .................... 501/7, 37, 38, 501/63, 68, 69, 70; 428/378, 426, 415, 384

[56] References Cited

U.S. PATENT DOCUMENTS

| | | | |
|---|---|---|---|
| 3,928,229 | 12/1975 | Neuroth | 252/301.6 P |
| 4,217,382 | 8/1980 | Toritani | 428/66 |
| 4,849,036 | 7/1989 | Powell et al. | 156/99 |
| 4,851,372 | 7/1989 | Lindig et al. | 501/4 |

FOREIGN PATENT DOCUMENTS 1902432  9/1970  Germany.

OTHER PUBLICATIONS

Takamori, *Treatise on Materials Science and Technology*, vol. 17, pp. 173, 194–196. Tomozawa et al., eds., Academic Press (1979) no month.
Schiffner et al., Glastech. Ber., 60(6):211–221 (1987) no month.
Schiffner et al., Glastech. Ber., 60(7):239–247 (1987) no month.
Petzoldt et al., J. of Non–Crystalline Solids, 129:191–198 (1991) no month.

*Primary Examiner*—Karl Group
*Attorney, Agent, or Firm*—Millen, White, Zelano, & Branigan

[57] ABSTRACT

A Cu-doped/Fe-doped low expansion glass ceramic composition comprising:

| | Wt. % |
|---|---|
| $SiO_2$ | 50–65 |
| $Al_2O_3$ | 18–27 |
| $P_2O_5$ | 0–10 |
| $Li_2O$ | 2–6 |
| $Na_2O$ | 0–2 |
| $K_2O$ | 0–2 |
| $B_2O_3$ | 0–1 |
| MgO | 0–4 |
| ZnO | 0–5 |
| CaO | 0–4 |
| BaO | 0–5 |
| $TiO_2$ | 1–3 |
| $ZrO_2$ | 1–3 |
| $As_2O_3$ | 0–1.5 |
| $Sb_2O_3$ | 0–1.5 |
| CuO | 0–3 |
| $Fe_2O_3$ | 0–1 | wherein the total amount of $SiO_2$, $Al_2O_3$ and $P_2O_5$ is 80–89 wt. %, and said glass ceramic contains as a dopant 0.1–3 wt. % CuO, 0.1–1 wt. % $Fe_2O_3$ or a combined CuO+$Fe_2O_3$ amount of 0.1–4 wt. %. The glass ceramic composition is suitable for use as a cladding material for solid laser energy storage mediums as well as for use in beam attenuators for measuring laser energy level and beam blocks or beam dumps used for absorbing excess or unused laser energy.

20 Claims, No Drawings

CLADDING GLASS CERAMIC FOR USE IN HIGH POWERED LASERS

SUMMARY OF THE INVENTION

The invention relates to preventing parasitic oscillation from occurring in solid-state laser energy storage materials such as used in high peak power, high energy and high-average power laser systems. In particular, the invention relates to an absorptive low-expansion glass ceramic cladding glass for absorbing amplified spontaneous emission (ASE), produced by a laser energy storage medium and thereby reducing or preventing the occurrence of parasitic oscillation in the solid-state laser. Furthermore, the invention also relates to methods of absorbing amplified spontaneous emissions and suppressing parasitic oscillations in, for example, high energy systems, as well as a cladding/solid-state laser composite wherein the cladding is an absorptive low-expansion glass ceramic.

The occurrence of amplified spontaneous emissions and parasitic oscillations in solid state laser energy storage materials is well known in the field of solid-state laser systems. See, for example, Trenholme, "Fluorescence Amplification and Parasitic Oscillation Limitations in Disk Lasers," NRL Memorandum Rep. 2480, July 1972; Swain et al., J. Appl. Phys., 40:3973 (1969); McMahon et al., IEEE J. Quantum Electron, QE-9, 992 (1973); Tonks, J. Appl. Phys., 35:1134 (1963); Sibert et al., J. Appl. Phys., 40:4434 (1969); Glaze et al., Applied Optics, 13:2808 (1974); and Brown et al., Applied Optics, 17:211 (1978). See also Powell et al., U.S. Pat. No. 4,849,036, which describes a method of suppressing parasitic oscillations in solid-state laser material wherein a laser light absorbing material layer is adhered to the outer surface of the peripheral edge of a solid-state laser material by the use of a thin bonding agent layer.

Briefly, the effect of ASE and the resultant parasitic oscillations occur as the result of spontaneous decay of excited atoms and internal reflection of the resultant photons. Thus, during optical pumping, some of the excited atoms of the active lasing entity, e.g., excited Nd-atoms, will spontaneously decay, thereby resulting in the emission of photons at the frequency of the laser transition. As these photons traverse the solid-state lasing media, they become amplified. If the photons generated by spontaneous decay are emitted at angles greater than the critical angle for total internal reflection, the photons become trapped and will travel through the solid-state laser material by total internal reflection until they reach the edge of the solid-state material. At the edge, these amplified spontaneous emissions can be totally or partially reflected back into the solid-state laser material. If the signal gain achieved by these photons in traversing the solid-state material exceeds the reflection losses at the edge, the process can proceed indefinitely, resulting in the effect known as parasitic oscillation.

Parasitic oscillation results in the reduction of stored energy in the laser medium by de-pumping the excited ions in the upper laser level. However, this effect can be eliminated by attaching a cladding glass to the peripheral edge of solid-state laser material wherein the cladding glass absorbs the accumulated spontaneous emission rather than reflecting and scattering these emissions, thereby preventing the occurrence of parasitic oscillation.

Edge cladding glasses are well known within the laser art. See, for example, U.S. Pat. No. 4,849,036 (Powell et al.) and U.S. Pat. No. 4,217,382 (Toritani). Although the known cladding materials are in general suitable for absorbing amplified spontaneous emissions and preventing parasitic oscillations, the thermal operating range of the cladding glass is limited. The current cladding materials are limited because they expand significantly when heated by the absorbed spontaneous emission. This expansion causes optical distortions in the laser energy storage material that the cladding is attached to and thereby affects the quality of the transmitted laser beam. Current cladding materials are bonded to the energy storage material by an adhesive or fusion bond. Stress produced by expansion of the cladding material due to absorbed spontaneous emission can cause either optical distortion in the laser glass, failure of the bond, or both. Therefore, there is still a need to provide edge cladding material which is not only effective for absorbing amplified spontaneous emissions and reducing parasitic oscillations, but also is capable of operating over a wide temperature range without resulting in the inducement of stress via thermal expansion.

Therefore, an object of the invention is to provide a low-expansion solid material which is capable of absorbing light at the laser wavelength and thus is useful as a cladding material to prevent parasitic oscillation from occurring in the solid-state laser energy storage material. For example, in the case of neodymium-doped solid-state laser material, an object is to provide a low-expansion solid cladding material which preferably absorbs light at a wavelength of 1.06 μm.

Another object of the invention is to provide a low-expansion glass ceramic material which is suitable for use as a beam attenuator, such as used in calorimeters for, e.g., high peak power or high average power laser applications.

A further object of the invention is to provide low expansion glass ceramic material suitable for use as a beam block or beam dump for absorbing unused or excess energy from, e.g., high power lasers.

Upon further study of the specification and appended claims, further objects and advantages of this invention will become apparent to those skilled in the art.

These objects are achieved by a Cu- and/or Fe-doped glass ceramic composition which absorbs light at, for example, a wavelength of 1.06 μm and which exhibits a coefficient of thermal expansion of $\pm 0.1 \times 10^{-6}$/K. at 0°–50° C.

Generally, the glass-ceramic composition is suitable for absorbing light at wavelengths of greater than about 0.8 μm, for example, light at a wavelength of 1.06 μm from Nd lasers, 1.3 μm from Nd lasers or Pr lasers, 1.5 μm from Er lasers, etc.

According to a preferred aspect of the invention, the Cu- and/or Fe-doped laser cladding glass ceramic is made from a glass composition comprising (on an oxide basis):

|  | Wt. % | Mol. % |
| --- | --- | --- |
| $SiO_2$ | 50–65 | 53–77 |
| $Al_2O_3$ | 18–27 | 13–18 |
| $P_2O_5$ | 0–10 | 0–4 |
| $Li_2O$ | 2–6 | 6–9 |
| $Na_2O$ | 0–2 | 0–2 |
| $K_2O$ | 0–2 | 0–1 |
| $B_2O_3$ | 0–1 | 0–1 |
| $MgO$ | 0–4 | 0–5 |
| $ZnO$ | 0–5 | 0–3 |
| $CaO$ | 0–4 | 0–4 |
| $BaO$ | 0–5 | 0–2 |
| $TiO_2$ | 1–3 | 0.5–3 |
| $ZrO_2$ | 1–3 | 0.5–2 |
| $As_2O_3$ | 0–1.5 | 0–0.5 |

-continued

|  | Wt. % | Mol. % |
|---|---|---|
| $Sb_2O_3$ | 0–1.5 | 0–0.4 |
| CuO | 0–3 | 0–5 |
| $Fe_2O_3$ | 0–1 | 0–3 | wherein the total amount of $SiO_2$, $Al_2O_3$ and $P_2O_5$ is 80–89 wt. % (83–86 mole %), and the glass ceramic contains as a dopant 0.1–3 wt. % CuO (0.09–2.54 mole %), 0.1–1 wt. % $Fe_2O_3$ (0.04–0.43 mole %) or a combined CuO+$Fe_2O_3$ amount of 0.1–4 wt. % (0.04–2.94 mole %).

In accordance with a further preferred aspect of the invention, the laser cladding glass ceramic is made from a glass composition consisting essentially of (on an oxide basis:

|  | Wt. % | Mol. % |
|---|---|---|
| $SiO_2$ | 50–56 | 59–68 |
| $Al_2O_3$ | 22–26 | 15–18 |
| $P_2O_5$ | 6–8 | 2–4 |
| $Li_2O$ | 3–4 | 8–9 |
| $Na_2O$ | 0–1 | 0–1 |
| $K_2O$ | 0–1 | 0–1 |
| $B_2O_3$ | 0–5 | 0 |
| MgO | 0–2 | 0–4 |
| ZnO | 1–2 | 1–2 |
| CaO | 0–1 | 0–3 |
| BaO | 0–5 | 0–2 |
| $TiO_2$ | 2–3 | 1–3 |
| $ZrO_2$ | 1–2 | 0.5–2 |
| $As_2O_3$ | 0–1.5 | 0–0.5 |
| $Sb_2O_3$ | 0–1.5 | 0–0.4 |
| CuO | 0–3 | 0–3 |
| $Fe_2O_3$ | 0–1 | 0–1. | wherein the total amount of $SiO_2$, $Al_2O_3$ and $P_2O_5$ is 80–89 wt. % (83–86 mole %), and the glass ceramic contains as a dopant 0.1–3 wt. % CuO (0.09–2.54 mole %), 0.1–1 wt. % $Fe_2O_3$ (0.04–0.43 mole %) or a combined CuO+$Fe_2O_3$ amount of 0.1–4 wt. % (0.04–2.95 mole %).

The base glass composition, without Cu and/or Fe dopant, is similar to the commercially available low-expansion glass ceramic Zerodur® used in a variety of applications such as mirror substrates for astronomical X-ray telescopes and optical instruments, temperature independent frames for ring laser gyroscopes, and distance standards for exact calibration of resonator distances in laser technology.

The basic general composition for Zerodur® material is described in DE 19 02 432. See also U.S. Pat. No. 4,851,372. The general glass ceramic compositions disclosed in these documents are listed below:

|  | DE '432 (Wt. %) | U.S. '372 (Wt. %) |
|---|---|---|
| $SiO_2$ | 35–70 | 50.0–65.0 |
| $Al_2O_3$ | 17–32 | 18.0–27.0 |
| $P_2O_5$ | 5.3–17 | 0–10.0 |
| $B_2O_3$ |  | 0–1.0 |
| $Li_2O$ | 2–6 | 2.5–4.0 |
| $Na_2O$ | 0–0.6 | 0–2.0 |
| $K_2O$ |  | 0–2.0 |
| MgO | 0.9–4 | 0–0.5 |
| ZnO | 1.7–5 | 1.0–5.0 |
| CaO |  | 0–4.0 |
| BaO |  | 1.0–5.0 |
| $TiO_2$ | 1.5–6 | 0–5.0 |
| $ZrO_2$ | 0.5–3 | 0–3.0 |
| $As_2O_3$ | .3–0.5 | 0–1.5 |
| $TiO_2 + ZrO_2$ | ≧3 |  |
| $P_2O_5/TiO_2$ | ≦3.8 |  |

In addition to a low coefficient of thermal expansion, it is also preferred that the doped glass ceramic according to the invention exhibit values for other properties similar to those possessed by Zerodur®, for example:

| Young's Modulus | about 9.03 GPa |
|---|---|
| Poisson's Ratio | about 0.243 |
| Thermal Conductivity | about 1.46 W/mK |
| Fracture Toughness | about 0.9 MPa · m 1/2 |
| Thermomechanical Figure of Merit | about 110.2 N · m 1/2/sec |

Also, in cladding applications, the low expansion glass ceramic composition according to the invention preferably exhibits a refractive index which substantially matches that of the solid laser material. Preferably, the cladding material has a refraction index of ±0.1, especially ±0.03, with respect to the refractive index of the laser material. The use of glass ceramics containing dopants is known within the field of laser technology. See, for example, Neuroth (U.S. Pat. No. 3,928,229) which describes a glass ceramic laser material containing neodymium ions as the active lasing agent. The Nd-glass ceramic laser of U.S. Pat. No. '229 exhibits the following general composition:

|  | Wt. % |
|---|---|
| $SiO_2$ | 50–70 |
| $P_2O_5$ | 0–10 |
| $Al_2O_3$ | 15–30 |
| $Li_2O$ | 2–8 |
| $Na_2O$ | 0.2–2 |
| MgO | 0–3 |
| CaO | 0–3 |
| ZnO | 0.5–3 |
| $TiO_2$ | 1.0–3 |
| $ZrO_2$ | 1.0–3 |
| $As_2O_3$ | 0–2 |
| $Sb_2O_3$ | 0–2 |
| $Nd_2O_3$ | 1–8 |
| MgO + CaO | 0.5–3 |
| $As_2O_3 + Sb_2O_3$ | 0.0–2.0 |

The advantageous low-expansion characteristics of the Zerodur® materials is strongly dependent upon its composition overall, as well as the composition of the crystalline structure and glassy phase present within the glass ceramic material.

However, in adding amounts of copper or iron dopant to the base Zerodur composition, it was not known whether the Cu and/or Fe would enter into the crystal structure or remain in the glassy phase. If appreciable amounts of Cu and/or Fe were incorporated into the crystal structure, the resultant crystal structure would not likely exhibit the required negative expansion and a near zero CTE (coefficient of thermal expansion) material would not be obtained.

On the other hand, if Cu remained in the glassy phase, the glass phase could exhibit too low of a CTE to balance the negative CTE of the crystal phase. Thus, the resultant glass ceramic could exhibit a large non-zero negative CTE and be unsuitable as a cladding material. (CuO has been used in glasses which have relatively low coefficients of thermal expansion (see, for example, Takashi, "Solder Glasses," Treatise on Materials Science and Technology, Vol. 17, Glass II, Academic Press, 1979).)

Furthermore, one could not predict whether Fe and/or Cu could be added in amounts sufficient to exhibit the desired absorption coefficient for the wavelength of interest, e.g., 1.06 μm, and yet also yield a near zero expansion glass ceramic.

Thus, it was unexpected that, by the addition of dopants such as Cu and Fe, a glass ceramic material could be obtained which retained the low coefficient of thermal expansion property, as well as other characteristics of the Zerodur® material, yet at the same time provide sufficient dopant concentrations to achieve absorption of light at a wavelength of, for example, 1.06 μm.

The CuO added as a dopant results in the Cu remaining in the glass phase of the resultant glass-ceramic material. This achieves a glass phase which contains, for example, CuO, $Na_2O$, $K_2O$, CaO, BaO, excess $Al_2O_3$ and some unknown amount of $SiO_2$. According to the invention, CuO can be added in such a manner that, within the resultant glass-ceramic material, negative expansion of the crystal phase is balanced against positive expansion of the glass phase yielding a zero expansion glass-ceramic, e.g., a glass ceramic exhibiting a CTE of $-0.1\times10^{-6}$/K. to about $0\times10^{-6}$/K.

The $Fe_2O_3$ added as a dopant results in the Fe remaining in the glass phase. According to the invention, the addition of iron to the glass phase achieves a relatively high positive expansion which, when combined with the negative expansion of the crystal phase, results in a low positive expansion glass-ceramic. Thermal expansion values of about $1.0\times10^{-6}$/K. and lower can be achieved for relatively low doping levels of $Fe_2O_3$. Furthermore, in the case of $Fe_2O_3$, absorption coefficient achievable at a 1 wt. % doping level is in excess of that which is generally required for a cladding material.

Regarding the components of the cladding material, the glass ceramic must contain a sufficient amount of dopant, in particular Cu and/or Fe, to absorb amplified spontaneous emissions within a neodymium solid-state laser system. In particular, the amount of dopant should be sufficient to absorb ASE at a wavelength of 1.06 μm, the primary lasing wavelength for neodymium lasers. In this regard, the cladding glass ceramic preferably exhibits an absorption coefficient for light at 1.06 μm of 0.1–5 $cm^{-1}$, preferably 2–4 $cm^{-1}$, especially 2.6–3.0 $cm^{-1}$, e.g., 2.8 $cm^{-1}$. Alternatively, the dopant content should not be such that the low expansion characteristic is jeopardized.

When CuO is used as the dopant, it is preferably added in an amount of >0–3 wt. %, especially 0.05–<1 wt. %. Other possible CuO levels are, for example, 0.1, 0.2, 0.3, 0.4, 0.5, 0.6, 0.7, 0.8 and 0.9 wt. %. Following ceramization, if the glassy phase of the glass ceramic article contains an excess of CuO over 3 wt. %, unpredictable absorption coefficient values will occur for light at a wavelength of 1.06 μm.

On the other hand, when $Fe_2O_3$ is employed as the dopant, this compound is preferably present in an amount of >0–1 wt. %, especially 0.1–1 wt. %, in particular 0.5–0.7 wt. %. $Fe_2O_3$ can also be present in amounts such as 0.2, 0.3, 0.4, 0.6, 0.8 and 0.9 wt. %. At $Fe_2O_3$ contents greater than 1 wt. %, the coefficient of thermal expansion of the Fe-doped glass ceramic material increases beyond the desired range of $\pm0.1\times10^{-6}$/K.

In the glass ceramic compositions according to the invention, the Fe-doped compositions exhibit higher absorption coefficients for light at a wavelength of 1.06 μm, i.e., about 0.1–2.3/cm for Cu and about 0.1–5/cm for Fe. As a result, the Fe-doped compositions are more preferred than the Cu-doped compositions for use as cladding material in absorbing light at 1.06 μm since thinner pieces of cladding can be used.

Turning to the other components in the composition, the glass-ceramic composition contains $SiO_2$ as the principal glass former and as a component contributing to crystal formation. Generally, the $SiO_2$ content is 50–65 wt. %, preferably 50–56 wt. %, especially 53–56 wt. %. However, the $SiO_2$ content can also be defined in terms of 51, 52, 54, 55, 57, 58, 59, 60, 61, 62, 63 and 64 wt. %.

The presence of $Al_2O_3$ is important to provide the glass ceramic composition with enhanced chemical durability and better thermomechanical properties such as thermal conductivity and thermalexpansion. $Al_2O_3$ also acts as a contributor to crystal formation. Still, the amount of $Al_2O_3$ should not be so high as to induce excessive crystallization. In general, the amount of $Al_2O_3$ is 18–27 wt. %, preferably 22–26 wt. %, especially 23–26 wt. %. Other acceptable levels of $Al_2O_3$ are 19, 20, 21, 24 and 25 wt. %.

The glass-ceramic also can contain up to 10 wt. % $P_2O_5$, preferably 6–8 wt. % $P_2O_5$, in particular 7–8 wt. %. In silicate glasses, $P_2O_5$ often leads to phase separation which is an important step in the formation of negative expansion crystallites. $P_2O_5$ is also a constituent of the high quartz solid solution crystal. Other acceptable amounts of $P_2O_5$ are 1, 2, 3, 4, 5 and 9 wt. %.

$LiO_2$, in addition to $SiO_2$ and $Al_2O_3$, is also an important component of crystal formation. Generally, $LiO_2$ is used in an amount of 2–6 wt. %, preferably 3–4 wt. %. $LiO_2$ can also be present, for example, in an amount of 5.0 wt. %.

$Li_2O$, MgO and ZnO each contribute to the formation of the high-quartz solid-solution crystals. The substitution of Al for Si in the crystal requires charge compensation which is provided by Li, Mg and Zn. Thus, MgO can be present in an amount of 0–4 wt. %., e.g., 1, 2 or 3 wt. %, and ZnO can be present in an amount of 0–5 wt. %, e.g. , 1, 2, 3 or 4 wt. %.

The $Na_2O$, $K_2O$, CaO, BaO, excess $Al_2O_3$ and $SiO_2$ form the residual glass phase of the glass-ceramic. The components $B_2O_3$, $Na_2O$, $K_2O$, CaO and BaO are added to the composition to effect the workability, for example, lower melting temperature, of the glass.

Suitable amounts for these components are: 0–2 wt. %., e.g., 1 wt. %, for $Na_2O$; 0–2 wt. %, e.g., 1 wt. %, for $K_2O$; 0–4 wt. %, e.g., 1, 2 or 3 wt. %, for CaO; 0–5 wt. %, e.g., 1, 2, 3 or 4 wt. %, for BaO; and 0–1 wt. %, e.g., 0.5 wt. %, for $B_2O_3$.

To facilitate crystal formation, the glass composition contains $TiO_2$ and/or $ZrO_2$ as nucleating agents. Generally, $TiO_2$ and $ZrO_2$ are both present in a total amount of at least 2 wt. %. Preferably, the glass composition contains 2–3 wt. % $TiO_2$ and 1–2 wt. % $ZrO_2$. Regarding the use of $TiO_2$ and/or $ZrO_2$ as nucleating agents, see also J. Petzoldt et al., J. of Non-Crysto Sol., 129:191–198 (1991); Ulrich Schiffner et al., Glastech. Ber., 60 (6) :211–211 (1987); and Ulrich Schiffner et al., Glastech. Ber., 60 (7) :239–247 (1987).

It is also desirable to add in small amounts of conventional refining agents such as $As_2O_3$ and $Sb_2O_3$ in order to aid in the manufacturing process while not compromising the combination of properties achieved in the inventive glass ceramic product. Thus, the glass composition can contain 0–1.5 wt. % $As_2O_3$ or 0–1.5 wt. % $Sb_2O_3$. In addition, $As_2O_3$ and $Sb_2O_3$ can be combined together in the glass composition. In such a case, the total amount of $As_2O_3$ and $Sb_2O_3$ is 0–3 wt. %, preferably 0–1.5 wt. %.

Is it also possible to add other ingredients to the glass composition, e.g., anti-solarization agents. However, this is generally not preferred.

The unceramed glass used in the invention can be fully conventionally prepared by mixing appropriate amounts of each constituent to form a batch composition. A batch composition is then charged into an appropriate crucible, such as a platinum or ceramic crucible and melted by, e.g., induction heating at temperatures of preferably 1100°–1500° C., the selected melting temperature being dependent upon the chosen composition. Subsequently, the glass can be refined at temperatures preferably exceeding 1,500° C. for typically 2–4 hours, again dependent on composition and melt viscosity, preferably with equal intervals of gas bubbling and stirring.

The glass is then cast in, e.g., steel molds, and annealed at a temperature about 20° above the glass transformation temperature for about 2 hours. The glass material is then subjected to a ceramization process wherein the glass sample is heated at a rate of about 4° C./minute from room temperature to 620° C. Thereafter, the heating rate is changed to 0.13° C./minute until a temperature of preferably about 830° C. is reached. Subsequently, the sample is held at a temperature of about 830° C. for approximately 3 hours. Following this holding period, the sample is cooled to room temperature, for example, simply by turning the oven off.

The above procedure can be used for, e.g., relatively small glass samples, for example, about 0.5 liters. For larger glass samples, such as on the order of 1 ton in weight, the production process can be modified accordingly by one of ordinary skill in the art based on conventional knowledge within the glass ceramization field and using routine experimentation.

Following the initial general ceramization process, it is possible to adjust the final CTE (coefficient of thermal expansion) of the glass ceramic to within the range of $0\pm0.1\times10^{-6}$/K. by processes such as described by Petzoldt et al., "Chemistry and Structure of Glass-Ceramic Materials for High Precision Optical Applications," J. of NonCryst. Sol., 129:191–198 (1991). For example, if the CTE value of the glass ceramic obtained after the initial ceramization procedure is negative but somewhat outside the range of $0\pm0.1\times10^{-6}$/K., the glass ceramic can be subjected to a second thermal cycle which will bring the CTE value closer to 0. In this second thermal cycle, the glass ceramic is held in the crystal growth temperature region 700°–800° C. for various time periods. The holding time will be dependent upon the amount of CTE that has to be shifted. However, this type of treatment is only suitable for shifting the CTE in a positive direction.

After the glass-ceramic material has been made, it may be cut, ground and polished utilizing known procedures such as used for the art associated with working-up optical glass. See, for example, Tetsuro Izumitani, "Polishing, Lapping and Diamond Grinding of Optical Glass", in Treatise on Materials Science and Technology, Volume 17: Glass II, edited by Minoru Tomozawa and Robert H. Doremus, Academic Press, New York, 1979, and T. S. Izumitani, Optical Glass, American Institute of Physics Translation Series, New York, 1986.

The pieces of the glass-ceramic cladding composition in accordance with the invention can be fused or adhesively bonded to solid-state laser material, such as neodymium glass laser disks. In this regard, preferably the cladding glass ceramic pieces are adhesively bonded to the solid laser material using suitable agents. For example, the cladding can be bonded to the solid laser material in accordance with the process described by Powell et al., U.S. Pat. No. 4,849,036. See also J. Campbell et al., "Development of Composite Polymer-Glass Edge Claddings for Nova Laser Disks," in *Laser Induced. DaMage in Optical Materials:* 1986, Boulder Damage Symposium, National Institute of Standards Special Publication 752, p. 19–41 (September 1988).

The preferred bonding agent is a two-part epoxy that matches the refractive index of the laser glass and is described in the reference given above.

In particular, the bonding agents are applied as a thin layer to the solid-state laser material covering the peripheral edge thereof and subsequently strips of cladding glass ceramic are applied to the surfaces coated with the bonding agent. The bonding agent can be selected from inorganic adhesives, cements, organic adhesives, organic polymers and polymerizable polymers. Further, it is preferred for the bonding agent to have a refractive index which matches the refractive index of the solid-state laser material and the cladding glass ceramic as closely as possible.

The above discussion concerns the cladding glass ceramic aspect of the invention. However, the Cu and/or Fe-doped glass ceramic in accordance with the invention can also be used as beam attenuators. In this embodiment, the glass ceramic according to the invention can be used as attenuator plates for calorimeters associated with, e.g., high peak power or high average power lasers. In this regard, the laser beam is directed onto an attenuator where it is absorbed producing a corresponding temperature rise. The temperature rise can then be directly correlated by the calorimeter to the laser energy emanating from the laser. Because of the low expansion of the glass ceramic according to the invention, when used as the attenuator for a calorimeter, large amounts of energy from high peak power or high average power lasers can be absorbed without causing stress which could lead to failure of the calorimeter.

According to a further aspect, the glass ceramic composition according to the invention can be used as a beam block or beam dump for absorbing a high power laser beam. In this application, excess or unused laser energy emanating from a high power layer is directed onto a plate of the glass ceramic according to the invention whereby the excess or unused laser energy is absorbed.

Generally, the overall process of cladding a laser glass disk or laser glass ceramic disk comprises four main steps: (1) laser disk and cladding glass preparation, (2) glass surface treatment, (3) adhesive bonding and curing, and (4) cladding finishing. In step (1), laser glass disks are shaped, edge polished, cleaned and inspected for foreign particles. Likewise, cladding glass strips are cut to size and then polished on one side and ground on the other. The polished side of the cladding later serves as the bonding surface. In step (2), the bonding surfaces of both the cladding and laser disks are chemically treated by the application of a coupling agent (e.g., a silane coupling agent) to improve bond adhesion. During step (3), the laser disk and cladding glass are first placed in a bonding fixture. The adhesive reactants are filtered, mixed in the proper stoichiometric quantities and applied to the polished surface of the cladding glass. Each cladding strip is slowly pressed into place and the disk remains in the bonding fixture for a time sufficient for the adhesive to set. If necessary, the adhesive can be thermally cured by heating the clad disk in an oven. Finally, the clad disk faces are ground and polished to the required wavefront quality needed for laser operation.

During operation, the maximum temperature rise experienced by the cladding material is at the cladding/solid laser material interface. Typically, it is desirable to keep this temperature rise below 35° C. for current claddings. This level is largely determined by stresses produced in the cladding and at the epoxy bond due to the thermal excursions. However, with the cladding glass ceramic according to the invention, the temperature rise can be as high as, for example, 100° C. since the low thermal expansion coefficient minimizes the thermal stresses during heating.

The doped glass ceramic according to the invention is especially useful as a cladding glass in laser systems which employ a neodymium-doped solid-state laser.

Such a laser glass is described in U.S. Pat. No. 4,075,120. The general phosphate laser glass compositions disclosed in this document are listed below:

|         | U.S. '120 Mole % |
|---------|------------------|
| $P_2O_5$   | 35–65            |
| $R_2O_3$   | 0.01–15          |
| RO      | 5–30             |
| $R_2O$     | 5–40             |
| $Nd_2O_3$  | 0.01–7           | wherein $R_2O_3$ is selected from the group consisting of $Al_2O_3$, $La_2O_3$, $Y_2O_3$, $Tm_2O_3$, $B_2O_3$ and $Er_2O_3$ and mixtures thereof, wherein RO is selected from the alkaline earth oxide group consisting of BaO, BeO, MgO, SrO, CaO and mixtures thereof, wherein $R_2O$ is selected from the alkali metal oxide group consisting of $Li_2O$, $K_2O$, $Na_2O$, $Rb_2O$ and mixtures thereof and wherein a solarization inhibiting oxide is present in an amount sufficient to prevent discoloration, and wherein the solarization inhibiting oxide is selected from the group consisting of $TiO_2$, $Sb_2O_3$, $CeO_2$, $SiO_2$ and mixtures thereof.

See also U.S. Pat. No. 3,471,409 which describes a general neodymium silicate laser glass containing:

|         | U.S. '409 Mole % |
|---------|------------------|
| $SiO_2$    | 45–75            |
| $Al_2O_3$  | 0–8              |
| $Li_2O$    | 15–30            |
| CaO     | 0.5–30           |
| $Nd_2O_3$  | 0.1–2            |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, are hereby incorporated by reference.

EXAMPLES

We note that some of the examples achieve properties which fall outside the ranges described above as desirable. However, these examples demonstrate the importance of certain factors discussed above in achieving the desired properties. Further, these examples provide valuable guidance as to how routine experimentation may be utilized to select compositions within the general compositional space defined for the invention. Fully conventional consideration will, of course, be given by skilled workers in any study of these examples and the experimental errors involved in measuring the disclosed properties, e.g., ±1% for thermal coefficient of expansion.

TABLE 1

Cu- and Fe-Doped Glass Ceramics

| Oxides | C0 | C1 | C2 | C3 | C4 | C5 | C6 | C7 | C8 |
|---|---|---|---|---|---|---|---|---|---|
| $SiO_2$ | 55.46 | 55.19 | 54.92 | 54.38 | 53.87 | 53.60 | 53.3 | 52.83 | 50.44 |
| $Al_2O_3$ | 25.01 | 24.89 | 24.77 | 24.53 | 24.29 | 24.17 | 24.06 | 23.83 | 22.75 |
| $P_2O_5$ | 7.32 | 7.28 | 7.24 | 7.17 | 7.10 | 7.07 | 7.04 | 6.97 | 6.65 |
| $Li_2O$ | 3.62 | 3.60 | 3.58 | 3.55 | 3.51 | 3.50 | 3.48 | 3.45 | 3.29 |
| $Na_2O$ | .00 | .00 | .00 | .00 | .00 | .00 | .00 | .00 | .00 |
| $K_2O$ | .60 | .60 | .59 | .59 | .58 | .58 | .58 | .57 | .54 |
| $B_2O_3$ | .00 | .00 | .00 | .00 | .00 | .00 | .00 | .00 | .00 |
| MgO | 1.11 | 1.10 | 1.10 | 1.08 | 1.07 | 1.07 | 1.06 | 1.05 | 1.01 |
| ZnO | 1.50 | 1.49 | 1.48 | 1.47 | 1.45 | 1.44 | 1.44 | 1.42 | 1.36 |
| CaO | .00 | .00 | .00 | .00 | .00 | .00 | .00 | .00 | .00 |
| BaO | .00 | .00 | .00 | .00 | .00 | .00 | .00 | .00 | .00 |
| $TiO_2$ | 2.24 | 2.23 | 2.22 | 2.20 | 2.18 | 2.17 | 2.16 | 2.14 | 2.04 |
| $ZrO_2$ | 1.84 | 1.83 | 1.83 | 1.81 | 1.79 | 1.78 | 1.77 | 1.76 | 1.68 |
| $As_2O_3$ | 1.30 | 1.29 | 1.28 | 1.27 | 1.26 | 1.25 | 1.25 | 1.23 | 1.18 |
| Colorant | | | | | | | | | |
| CuO | .00 | .50 | .99 | 1.95 | 2.90 | 3.37 | 3.83 | 4.75 | 9.06 |
| $Fe_2O_3$ | .00 | .00 | .00 | .00 | .00 | .00 | .00 | .00 | .00 |
| Total | 100.00 | 100.00 | 100.00 | 100.00 | 100.00 | 100.00 | 100.00 | 100.00 | 100.00 |
| Nominal Wt. % dopant | .0 | .5 | 1.0 | 2.0 | 3.0 | 3.5 | 4.0 | 5.0 | 10.0 |
| Properties Abs. Coeff.(/cm) | .125 | .306 | .612 | 1.242 | 2.146 | 2.51 | 2.070 | 7.400 | 70.000 |
| CTE (0–50° C.) × $10^{-6}$/K | −.068 | −.085 | −.143 | −.193 | −.216 | −.211 | * | * | * |
| nd | 1.54129 | 1.54338 | 1.54393 | 1.54473 | 1.54631 | 1.54700 | 1.54683 | * | * |

TABLE 1-continued

Cu- and Fe-Doped Glass Ceramics

| Oxides | F1 | F2 | F3 | F4 | F5 | F6 | F7 | CF1 |
|---|---|---|---|---|---|---|---|---|
| $SiO_2$ | 55.42 | 55.30 | 55.19 | 55.09 | 54.92 | 52.83 | 55.14 | 54.91 |
| $Al_2O_3$ | 24.99 | 24.94 | 24.89 | 24.84 | 24.77 | 23.83 | 24.87 | 24.77 |
| $P_2O_5$ | 7.31 | 7.29 | 7.28 | 7.27 | 7.24 | 6.97 | 7.27 | 7.24 |
| $Li_2O$ | 3.61 | 3.61 | 3.60 | 3.59 | 3.58 | 3.45 | 3.60 | 3.58 |
| $Na_2O$ | .00 | .00 | .00 | .00 | .00 | .00 | 0 | .00 |
| $K_2O$ | .60 | .60 | .60 | .59 | .59 | .57 | 0.59 | .59 |
| $B_2O_3$ | .00 | .00 | .00 | .00 | .00 | .00 | 0 | .00 |
| MgO | 1.11 | 1.10 | 1.10 | 1.10 | 1.10 | 1.05 | 1.10 | 1.10 |
| ZnO | 1.49 | 1.49 | 1.49 | 1.48 | 1.48 | 1.42 | 1.49 | 1.48 |
| CaO | .00 | .00 | .00 | .00 | .00 | .00 | 0 | .00 |
| BaO | .00 | .00 | .00 | .00 | .00 | .00 | 0 | .00 |
| $TiO_2$ | 2.24 | 2.24 | 2.23 | 2.23 | 2.22 | 2.14 | 2.23 | 2.22 |
| $ZrO_2$ | 1.84 | 1.84 | 1.83 | 1.83 | 1.83 | 1.76 | 1.83 | 1.83 |
| $As_2O_3$ | 1.29 | 1.29 | 1.29 | 1.29 | 1.28 | 1.23 | 1.29 | 1.28 |
| Colorant | | | | | | | | |
| CuO | .00 | .00 | .00 | .00 | .00 | .00 | 0 | .50 |
| $Fe_2O_3$ | .10 | .30 | .50 | .69 | .99 | 4.75 | 0.59 | .50 |
| Total | 100.00 | 100.00 | 100.00 | 100.00 | 100.00 | 100.00 | 100.00 | 100.00 |
| Nominal Wt. % dopant | .1 | .3 | .5 | .7 | 1.0 | 5.0 | 0.6 | .5/.5 |
| Properties | | | | | | | | |
| Abs. Coeff.(/cm) | .690 | 1.470 | 2.430 | 3.220 | 4.160 | v1 | 2.810 | 2.530 |
| CTE (0–50° C.) × $10^{-6}$/K | −.026 | −.03 | .002 | .027 | .109 | .913 | 0.042 | −.040 |
| nd | 1.54287 | 1.54198 | 1.54255 | 1.54295 | 1.54355 | * | 1.54237 | 1.54308 |

Not Measured

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A Cu and/or Fe-doped glass ceramic composition having a coefficient of thermal expansion of 0±0.1× $10^{-6}$/K. at 0–50° C., said glass ceramic consisting essentially of (on an oxide basis):

| | Wt. % |
|---|---|
| $SiO_2$ | 50–65 |
| $Al_2O_3$ | 18–27 |
| $P_2O_5$ | 0–10 |
| $Li_2O$ | 2–6 |
| $Na_2O$ | 0–2 |
| $K_2O$ | 0–2 |
| $B_2O_3$ | 0–1 |
| MgO | 0–4 |
| ZnO | 0–5 |
| CaO | 0–4 |
| BaO | 0–5 |
| $TiO_2$ | 1–3 |
| $ZrO_2$ | 1–3 |
| $As_2O_3$ | 0–1.5 |
| $Sb_2O_3$ | 0–1.5 | wherein the total amount of $SiO_2$, $Al_2O_3$ and $P_2O_5$ is 80–89 wt. %, and said glass ceramic has as a dopant 0.1–3 wt. % CuO, 0.1–1 wt. % $Fe_2O_3$ or a combined CuO+$Fe_2O_3$ amount of 0.1–4 wt. %.

2. A Cu and/or Fe-doped glass ceramic composition according to claim 1, said glass ceramic consisting essentially of (on an oxide basis):

| | Wt. % |
|---|---|
| $SiO_2$ | 50–56 |
| $Al_2O_3$ | 22–26 |
| $P_2O_5$ | 6–8 |
| $Li_2O$ | 3–4 |
| $Na_2O$ | 0–1 |
| $K_2O$ | 0–1 |
| $B_2O_3$ | 0–5 |
| MgO | 0–2 |
| ZnO | 1–2 |
| CaO | 0–1 |
| BaO | 0 |
| $TiO_2$ | 2–3 |
| $ZrO_2$ | 1–2 |
| $As_2O_3$ | 0–1.5 |
| $Sb_2O_3$ | 0–1.5 | wherein the total amount of $SiO_2$, $Al_2O_3$ and $P_2O_5$ is 80–89 wt. %, and said glass ceramic has as a dopant 0.1–3 wt. % CuO, 0.1–1 wt. % $Fe_2O_3$ or a combined CuO+$Fe_2O_3$ amount of 0.1–4 wt. %.

3. A composition according to claim 1, having 50–56 wt. % $SiO_2$.

4. A composition according to claim 1, having 6–8 wt. % $P_2O_5$.

5. A composition according to claim 1, having 2–3 wt. % $TiO_2$.

6. A composition according to claim 1, having 1–2 wt. % $ZrO_2$.

7. A composition according to claim 1, having 0.05–<1 wt. % CuO.

8. A composition according to claim 1, having 0.1–1 wt. % $Fe_2O_3$.

9. A composition according to claim 1, having 0.5–0.7 wt. % $Fe_2O_3$.

10. A composition according to claim 1, wherein said glass ceramic composition exhibits an absorption coefficient for light at a wavelength of 1.06 μm of 0.1–5 cm$^{-1}$.

11. A composition according to claim 1, wherein said glass ceramic composition exhibits an absorption coefficient for light at a wavelength of 1.06 μm of 2–4 cm$^{-1}$.

12. A composition according to claim 7, wherein said glass ceramic composition exhibits a coefficient of thermal expansion of $-0.1$–$0 \times 10^{-6}$/K.

13. A composition according to claim 1, wherein said glass ceramic composition contains 22–26 wt. % Al$_2$O$_3$.

14. A composition according to claim 1, wherein said glass ceramic composition contains 3–4 wt. % LiO$_2$.

15. A composition according to claim 1, having 0.05–<1 wt. % CuO and 0.1–1 wt. % Fe$_2$O$_3$.

16. A composition according to claim 2, having 0.05–<1 wt. % CuO.

17. A composition according to claim 2, wherein said glass ceramic composition exhibits an absorption coefficient for light at a wavelength of 1.06 μm of 0.1–5 cm$^{-1}$.

18. A composition according to claim 2, wherein said glass ceramic composition exhibits an absorption coefficient for light at a wavelength of 1.06 μm of 2–4 cm$^{-1}$.

19. A composition according to claim 16, wherein said glass ceramic composition exhibits a coefficient of thermal expansion of $-0.1$–$0 \times 10^{-6}$/K.

20. A method of preparing a glass ceramic composition capable of absorbing light at a wavelength of 1.06 μm and having a coefficient of thermal expansion of $0 \pm 0.1 \times 10^{-6}$/K. at 0–50° C., said process comprising:

subjecting a glass composition consisting essentially of (on an oxide basis):

|  | Wt. % |
|---|---|
| SiO$_2$ | 50–65 |
| Al$_2$O$_3$ | 18–27 |
| P$_2$O$_5$ | 0–10 |
| Li$_2$O | 2–6 |
| Na$_2$O | 0–2 |
| K$_2$O | 0–2 |
| B$_2$O$_3$ | 0–1 |
| MgO | 0–4 |
| ZnO | 0–5 |
| CaO | 0–4 |
| BaO | 0–5 |
| TiO$_2$ | 1–3 |
| ZrO$_2$ | 1–3 |
| As$_2$O$_3$ | 0–1.5 |
| Sb$_2$O$_3$ | 0–1.5 | wherein the total amount of SiO$_2$, Al$_2$O$_3$ and P$_2$O$_5$ is 80–89 wt. %, and said glass composition has a dopant 0.1–3 wt. % CuO, 0.1–1 wt. % Fe$_2$O$_3$ or a combined CuO+Fe$_2$O$_3$ amount of 0.1–4 wt. % to a heating treatment from room temperature to 620° C. at a rate of about 4° C. per minute, heating said glass from 620° C. to 830° C. at a heating rate of about 0.13° C. per minute, holding said glass at a temperature of about 830° C. for about 3 hours, subsequently cooling the glass from 830° C. to room temperature.

* * * * *